United States Patent [19]
Yamashita

[11] Patent Number: 5,410,953
[45] Date of Patent: May 2, 1995

[54] TRACK APPARATUS FOR EGG BREAKING MECHANISMS

[75] Inventor: Tsuyoshi Yamashita, Tsuyama, Japan

[73] Assignee: Kyowa Machinery Co., Ltd., Okayama, Japan

[21] Appl. No.: 208,274

[22] Filed: Mar. 10, 1994

[30] Foreign Application Priority Data

Mar. 26, 1993 [JP] Japan .................. 5-091989

[51] Int. Cl.⁶ .................. A23J 1/09; A47J 43/14
[52] U.S. Cl. .................. 99/500; 99/498
[58] Field of Search .................. 99/495–500, 99/568, 582, 581, 577, 578; 426/299, 478, 490

[56] References Cited

U.S. PATENT DOCUMENTS

| | | | |
|---|---|---|---|
| 3,480,056 | 11/1969 | Willsey | 99/498 |
| 3,854,394 | 12/1974 | Willsey | 99/495 |
| 4,137,838 | 2/1979 | Warren | 99/582 |
| 4,321,864 | 3/1982 | Willsey | 99/577 |
| 4,764,387 | 8/1988 | Willsey | 426/299 |
| 4,773,322 | 9/1988 | Willsey | 99/499 |

FOREIGN PATENT DOCUMENTS 61-59089 12/1986 Japan .

Primary Examiner—Timothy F. Simone
Attorney, Agent, or Firm—Marks & Murase; Michael D. Bednarek

[57] ABSTRACT

A track apparatus for egg breaking mechanisms is provided which comprises a pair of endless chains extending along an endless moving path and carrying the egg breaking mechanisms, a pair of drive sprockets held in driving engagement with the chains, a pair of idle sprockets held in engagement with the chains, and a chain tensioning mechanism for slidably guiding the chains.

15 Claims, 5 Drawing Sheets

TRACK APPARATUS FOR EGG BREAKING MECHANISMS

BACKGROUND OF THE INVENTION

1. Field of the Invention:

This invention relates to a track apparatus for egg breaking mechanisms which can be advantageously incorporated in an automatic egg breaking apparatus for successively breaking eggs and taking out their contents.

2. Description of the Prior Art:

As is well known, eggs have found wide use. For example, the egg yolk may be used as a material for making mayonnaise or other food products. The egg white (albumen) may be used for making pharmaceutical products or as a binder for protein products. Due to such wide use of the egg, it is absolutely necessary in industry to use an automatic egg breaking apparatus for breaking eggs and taking out their contents at high speed.

Japanese Patent Publication No. 61-59089 discloses an egg breaking apparatus wherein an endless chain conveyor has a track apparatus that carries a plurality of egg breaking mechanisms at a constant pitch along the endless moving path of the chain conveyor. The chain conveyor is held in engagement with a plurality of sprocket assemblies as direction change assemblies, so that the moving path of the chain conveyor is divided by the direction change assemblies into different regions where each of the egg breaking mechanisms is caused to perform different operations which include egg reception, egg breaking, cleaning, and etc. One of the sprocket assemblies is a drive sprocket assembly for causing movement of the chain conveyor.

According to the prior art arrangement, all of the direction change assemblies are in the form of sprocket assemblies which cannot be conveniently cleaned due to the presence of the sprocket teeth. Thus, the prior art track assembly as a whole suffers a hygienic problem resulting from bacterial breeding at the sprocket assemblies which are fouled by the egg residues but insufficiently cleaned later.

SUMMARY OF THE INVENTION

It is, therefore, an object of the present invention to provide a track apparatus for egg breaking mechanisms which can be more conveniently washed than the prior art track apparatus.

According to the present invention, there is provided a track apparatus for egg breaking mechanisms comprising: an endless chain conveyor extending along an endless moving path and carrying the egg breaking mechanisms; a drive sprocket assembly held in driving engagement with the chain conveyor and serving as a direction change assembly for changing an extending direction of the moving path; and at least two additional direction change assemblies contacting the chain conveyor for further changing the extending direction of the moving path; wherein the additional direction change assemblies comprise a chain tensioning mechanism for slidably guiding the chain conveyor.

Obviously, due to the slidable guiding function, the chain tensioning mechanism need not have any toothed portion which would require a troublesome cleaning operation. Thus, the track apparatus as a whole can be cleaned more easily or conveniently than the prior art track apparatus.

Preferably, the track apparatus may further comprise an adjusting mechanism for positionally adjusting the chain tensioning mechanism to thereby adjust a tension applied to the chain conveyor. Further, the additional direction change assemblies may comprise an idle sprocket assembly held in engagement with the chain conveyor.

According to a preferred embodiment of the present invention, the chain conveyor comprises a pair of vertically spaced chains, and the drive sprocket assembly comprises a pair of vertically spaced drive sprockets in engagement with the respective chains. Further, the pair of chains may be preferably guided by a corresponding pair of vertically spaced chain guide rails each of which is in the form of a downwardly open channel member.

Each of the egg breaking mechanisms may have an upper end portion provided with a roller for coming into rolling contact with an upper one of the chain guide rails from above. Such an arrangement is preferred for insuring smooth movement of the chain conveyor.

The chain tensioning mechanism may comprise a pair of vertically spaced chain guide plates each of which has an arcuate sliding surface for slidably guiding a corresponding one of the chains. Further, an arcuate roller guide may be arranged along and above the arcuate sliding surface of an upper one of the chain guide plates, so that the roller of the egg breaking mechanism can also come into rolling contact with the roller guide from above.

The chain tensioning mechanism may be movably supported on a machine base. In this case, the adjusting mechanism may comprise a carrier fixed to the underside of the chain tensioning mechanism and having an internally threaded bore, and an externally threaded shaft rotatably mounted on the machine base in engagement with the threaded bore. The threaded shaft may be made rotatable by a handle. Further, the machine base may have a slot in which the carrier is slidably guided.

For purposes of installing the track apparatus in a space saving manner, it is advantageous if the moving path of the chain conveyor is made generally triangular.

Other objects, features and advantages of the present invention will become apparent from the following detailed description of the preferred embodiment given with reference to the accompanying drawings.

DETAILED DESCRIPTION OF THE PREFERRED EMBODIMENTS

Figure 1:
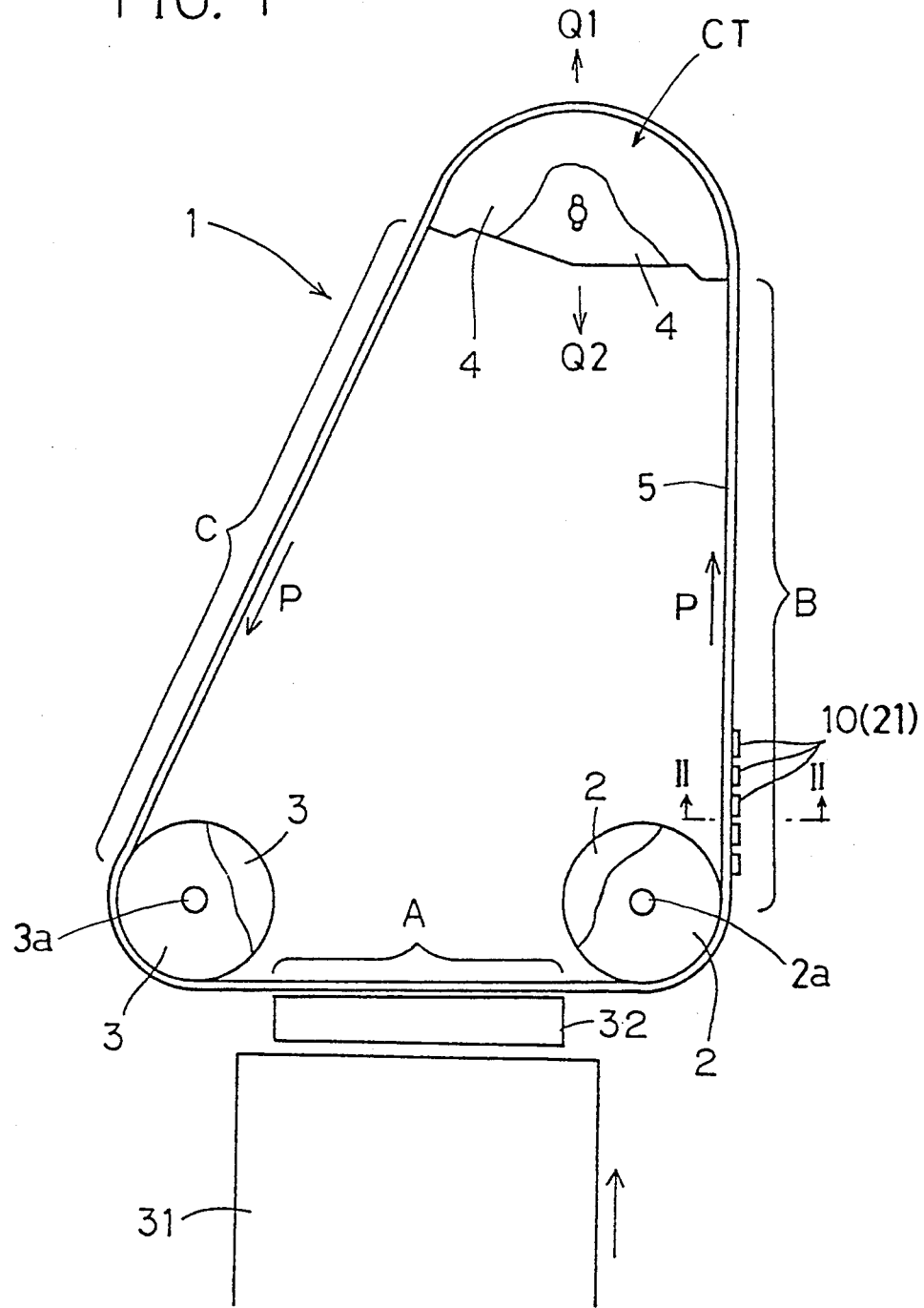
FIG. 1 is a top plan view schematically showing an egg breaking apparatus according to a preferred embodiment of the present invention.

Referring to FIG. 1 of the accompanying drawings, there is schematically shown an egg breaking apparatus 1 according to a preferred embodiment of the present invention, as seen from above. The egg breaking apparatus 1 comprises a pair of drive sprockets 2 as a first direction change point, a pair of idle sprockets 3 as a second direction change point, and a chain tensioning mechanism CT as a third direction change point.

The respective drive sprockets 2 are vertically spaced from each other as supported on a common drive shaft 2a. The drive shaft 2a is connected to a drive motor (not shown) through a suitable reduction mechanism (not shown). The drive sprockets themselves are known, so that the details relating to them are not described here.

Similarly, the respective idle sprockets 3 are vertically spaced from each other as supported on a common idle shaft 3a. Again, the drive sprockets themselves are known, so that their details are not described here.

The chain tensioning mechanism CT includes a pair of chain guide plates 4 which are vertically spaced from each other. The details of the chain guide plates 4 will be described hereinafter.

A pair of endless chains 5 (see also FIG. 2), namely, a chain conveyor, connect the pair of drive sprockets 2, the pair of idle sprockets 3 and the chain tensioning mechanism CT. When the drive shaft 2a is driven for rotation, the chains 5 move an endless moving path, as indicated by arrows P.

According to the illustrated embodiment, the pair of drive sprockets 2, the pair of idle sprockets 3 and the chain tensioning mechanism CT are disposed at the respective apexes of a right-angled triangle. As a result, the chain moving path is divided into three different regions which include an egg receiving region A, an egg breaking region B and an aftertreatment region C, as more specifically described later.

Figure 2:
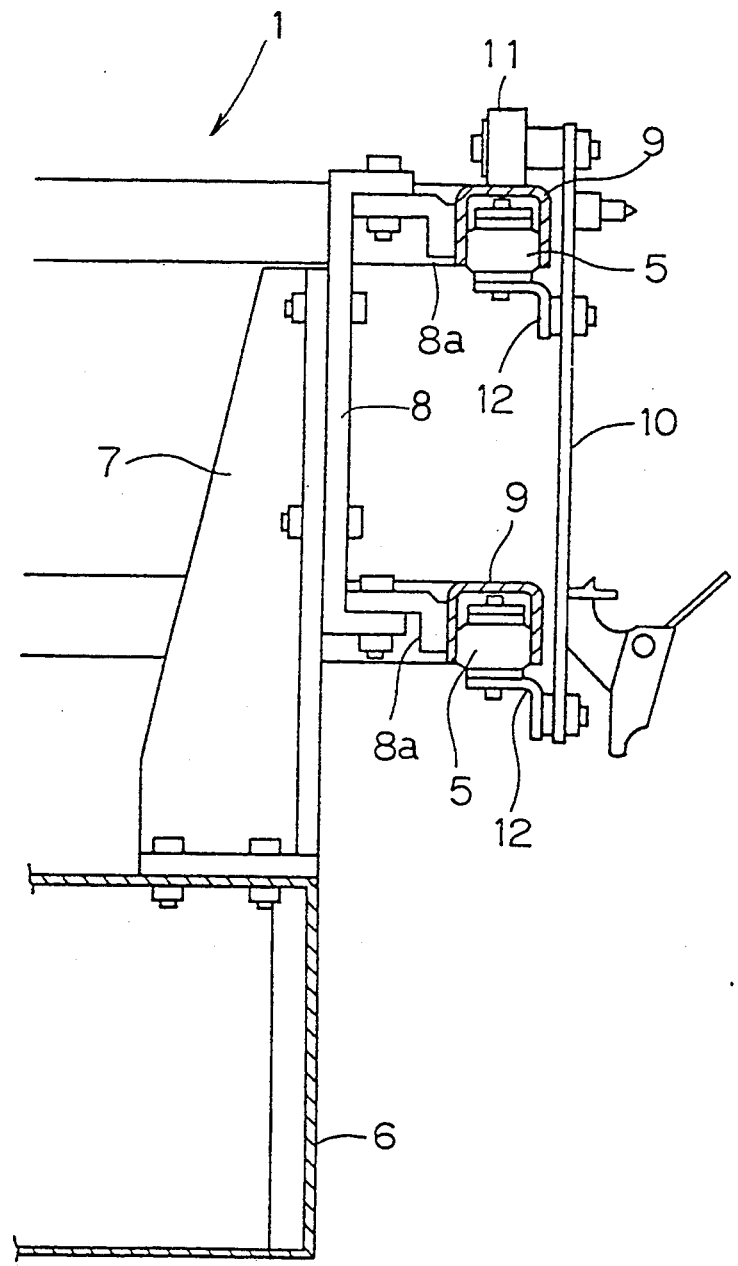
FIG. 2 is a sectional side view taken along lines II—II in FIG. 1.

As shown in FIG. 2, the egg breaking apparatus 1 has a machine base 6 from which a plurality of upright support arms 7 (only one shown) extend as suitably spaced from each other along the moving path (FIG. 1) of the chains 5 except for the portion of the chain tensioning mechanism CT. Each of the support arms 7 fixedly carries a rail mount 8 which, in turn, fixedly carries a pair of vertically spaced mounting lugs 8a for attachment to respective guide rails 9 by welding for example.

Each of the guide rails 9 is a channel member which is downwardly open for receiving a corresponding one of the chains 5. Each of the chains 5 is fixedly connected to a plurality of holders 10 by means of angle plates 12 as suitably spaced along the chain moving path (see also FIG. 1). Each of the holders 10 has an upper end provided with a roller 11 which rolls on the upper one of the guide rails 9.

Figure 3:
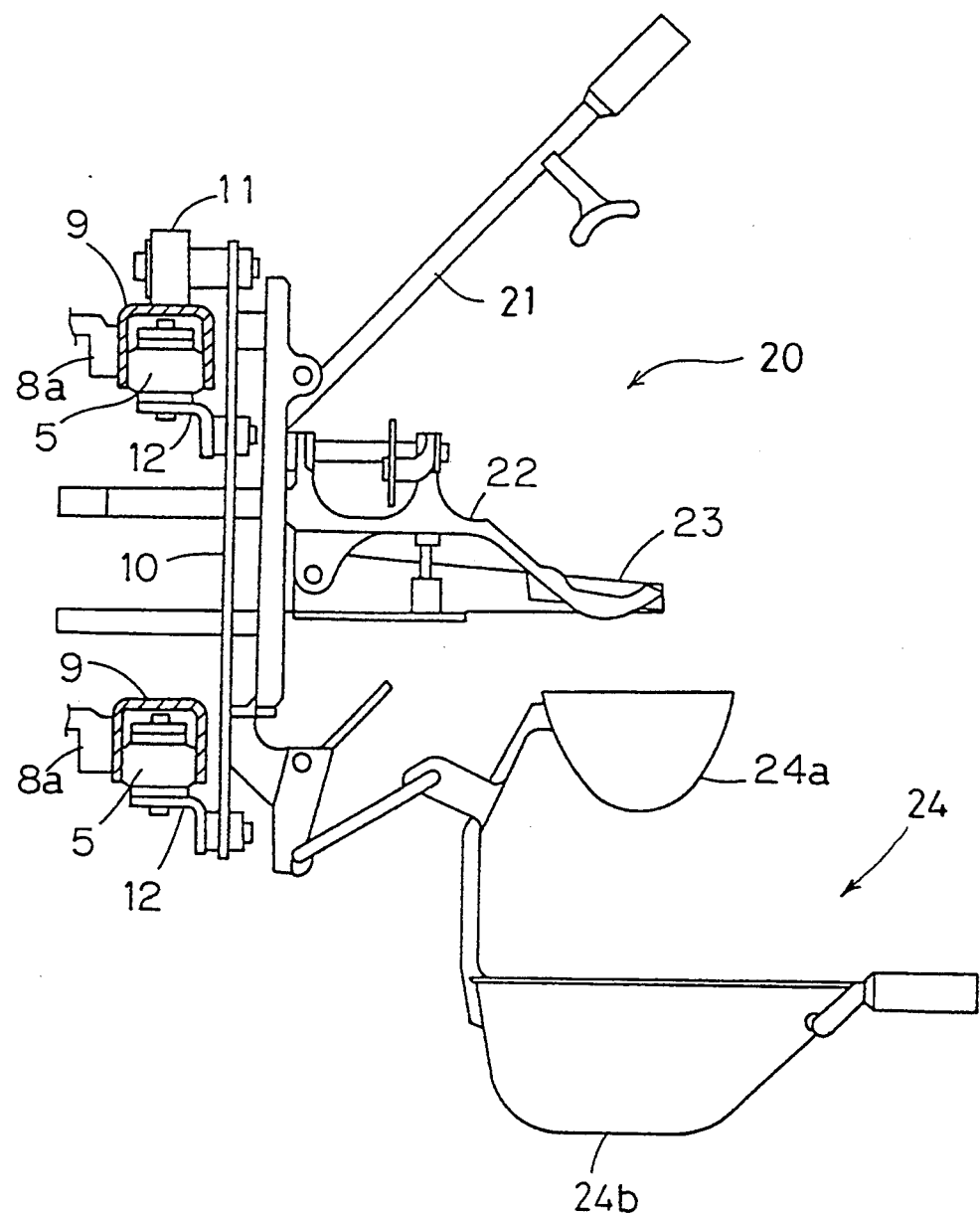
FIG. 3 is a fragmentary side view, partly in section, showing an egg breaking mechanism incorporated in the egg breaking apparatus of FIG. 1.

As shown in FIG. 3, each of the holders 10 removably carries an egg breaking mechanism 20 which mainly comprises an egg presser 21, an egg support 22, and a knife assembly 23. Since the egg breaking mechanism is not the subject of the present invention, the details of the egg breaking mechanism are not described here.

As also shown in FIG. 3, each of the holders 10 further carries a cup assembly 24 which includes an upper cup 24a and a lower cup 24b. The upper cup 24a receives the content of a broken egg from a corresponding egg breaking mechanism 20 above but has a slot (not shown) which allows falling of the egg white portion (albumen) while retaining only the egg yolk portion. The lower cup 24b receives the egg white portion falling from the upper cup 24a.

Figure 4:
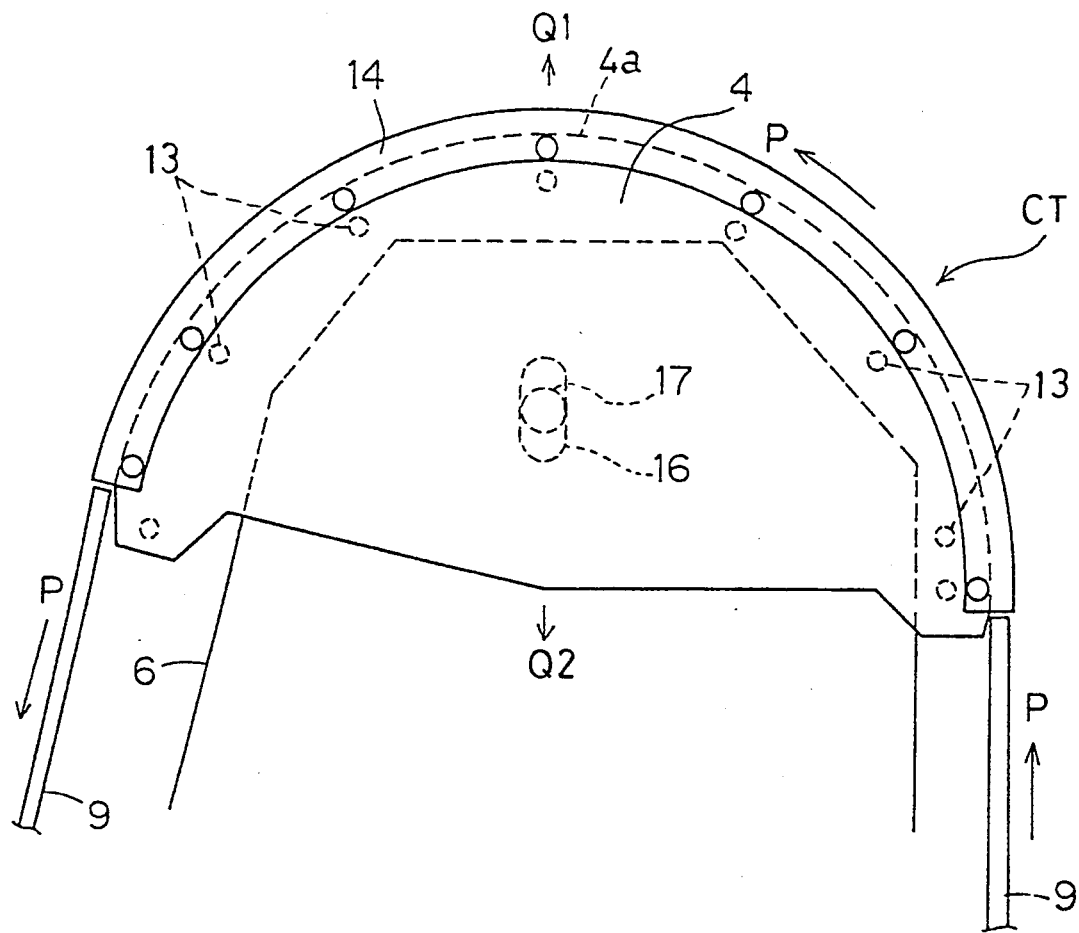
FIG. 4 is a fragmentary top plan view showing a chain tensioning mechanism incorporated in the same egg breaking apparatus.
Figure 5:
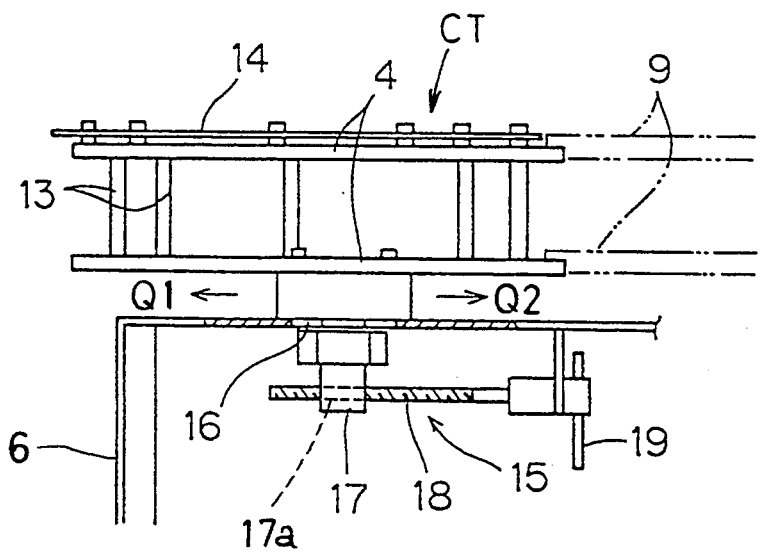
FIG. 5 is a side view, partly in section, showing the same chain tensioning mechanism.
Figure 6:
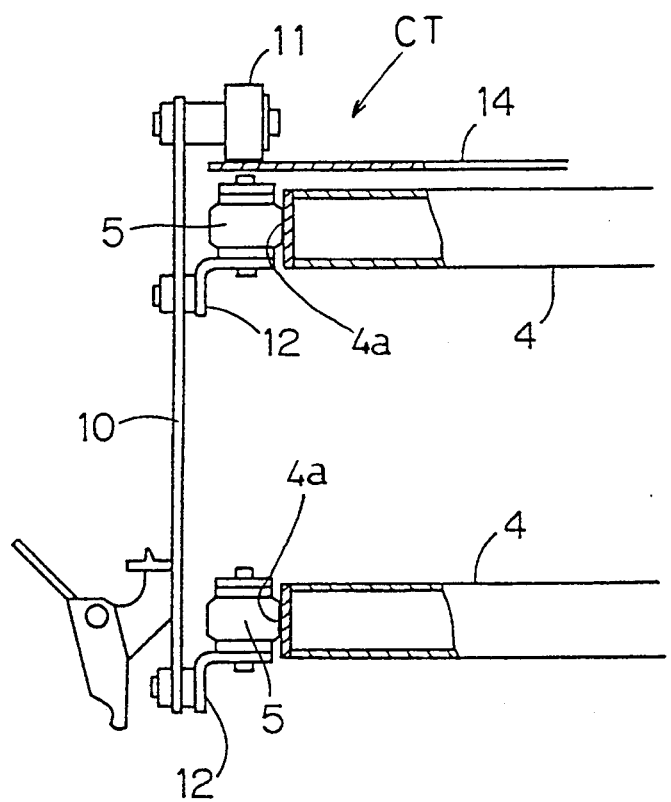
FIG. 6 is a side view, partly in section, showing the same chain tensioning mechanism together with the egg breaking mechanism.

As shown in FIGS. 4 to 6, the respective chain guide plates 4 of the chain tensioning mechanism CT are connected together by a plurality of connecting bars 13. Each of the chain guide plates 4 has an arcuate sliding surface 4a for guiding contact with a corresponding one of the chains 5 (FIG. 6). The upper one of the chain guide plates 4 carries an arcuate roller guide 14 extending along the arcuate sliding surface 4a for supporting the roller 11 (FIG. 6) of each holder 10. The roller guide 14 is arranged substantially flush and continuous with the upper surface of the upper one of the chain guide rails 9 (FIGS. 4 and 5).

The chain tensioning mechanism CT is positionally adjustable on the machine base 6 (see FIG. 5) by means of an adjusting mechanism 15. This adjusting mechanism includes a slot 16 formed in a top wall portion of the machine base 6, a carrier 17 extending downward from the underside of the chain tensioning mechanism CT for slidably penetrating through the slot 16, and an externally threaded shaft 18 engaging in an internally threaded bore 17a of the carrier 17 and supported on the machine base 6 for rotation by a handle 19. Thus, the position of the chain tensioning mechanism CT is adjustable back and forth by turning the handle 19, as indicated by arrows Q1, Q2 in FIGS. 4 and 5.

In operation, an egg conveyor 31 (see FIG. 1) successively supplies rows of eggs (not shown) to an egg shifting device 32. Each row of eggs may include six eggs for example, so that the egg shifting device 32 simultaneously shifts six eggs to a group of six egg breaking mechanisms 20 (see FIG. 3) in the egg receiving region A of the chain moving path between the pair of drive sprockets 2 and the pair of idle sprockets 3. The egg conveyor 31 and the egg shifting device 32 may be of the known type, so that their details are not described herein.

Each egg breaking mechanism 20 breaks the received egg as it moves from the pair of drive sprockets 2 to the chain tensioning mechanism CT in the egg breaking region B of the chain moving path. The operation of the egg breaking mechanism 20 may be controlled by cams (not shown) arranged along the moving path of the chains 5 for example.

In the aftertreatment region C of the chain moving path between the chain tensioning mechanism CT and the pair of idle sprockets 3 is performed aftertreatments which include distinguishing between acceptable egg contents and objectionable egg contents (at an inspection unit), separately collecting the yoke and white portions of the acceptable egg contents via different chutes (not shown) while discharging the objectionable egg contents, cleaning each egg breaking mechanism 20 at a cleaning unit (not shown), and so on. The inspection unit, the chutes and the cleaning unit together with a controller (not shown) may be arranged along the chain moving path.

According to the arrangement described above, one of the direction change points of the chain moving path is provided by the chain tensioning mechanism CT which slidably guides the chains 5. Due to the absence of sprocket teeth, the chain tensioning mechanism CT can be conveniently cleaned to prevent or reduce bacterial growth or breeding.

Further, the chain tensioning mechanism CT may be positionally adjusted for suitably adjusting the tension applied to the chains 5. Moreover, the triangular configuration of the chain moving path is preferred for saving an installation space.

The present invention being thus described, it is obvious that the same may be varied in many ways. For instance, the pair of idle sprockets 3 may be replaced by another chain tensioning mechanism which is similar to the one already described herein. Further, the endless chain moving path may be rendered rectangular or trapezoidal by adding another chain tensioning mechanism. Such variations are not to be regarded as a departure from the spirit and scope of the the invention, and all such variations as would be obvious to those skilled in the art are intended to be included within the scope of the following claims.

I claim:

1. A track apparatus for egg breaking mechanisms comprising:
    an endless chain conveyor extending along an endless moving path and carrying the egg breaking mechanisms;
    a drive sprocket assembly held in driving engagement with the chain conveyor and serving as a direction change assembly for changing an extending direction of the moving path; and
    at least two additional direction change assemblies contacting the chain conveyor for further changing the extending direction of the moving path;
    wherein the additional direction change assemblies comprise a nonrotatable chain tensioning mechanism for slidably guiding the chain conveyor.

2. The track apparatus according to claim 1, further comprising an adjusting mechanism for positionally adjusting the chain tensioning mechanism to thereby adjust a tension applied to the chain conveyor.

3. The track apparatus according to claim 1, wherein the additional direction change assemblies comprise an idle sprocket assembly held in engagement with the chain conveyor.

4. The track apparatus according to claim 1, wherein the chain conveyor comprises a pair of vertically spaced chains, the drive sprocket assembly comprising a pair of vertically spaced drive sprockets in engagement with the respective chains.

5. The track apparatus according to claim 4, further comprising a pair of vertically spaced chain guide rails, each of the chain guide rails being a downwardly open channel member for slidably receiving a corresponding one of the chains.

6. The track apparatus according to claim 5, wherein each of the egg breaking mechanisms has an upper end portion provided with a roller for coming into rolling contact with an upper one of the chain guide rails from above.

7. The track apparatus according to claim 4, wherein the chain tensioning mechanism comprises a pair of vertically spaced chain guide plates each of which has an arcuate sliding surface for slidably guiding a corresponding one of the chains.

8. The track apparatus according to claim 7, wherein the chain tensioning mechanism further comprises an arcuate roller guide arranged along and above the arcuate sliding surface of an upper one of the chain guide plates, each of the egg breaking mechanisms has an upper end portion provided with a roller for coming into rolling contact with the roller guide from above.

9. The track apparatus according to claim 2, wherein the chain tensioning mechanism is movably supported on a machine base, the adjusting mechanism comprising a carrier fixed to the chain tensioning mechanism and having an internally threaded bore, the adjusting mechanism further comprising an externally threaded shaft rotatably mounted on the machine base in engagement with the threaded bore, the threaded shaft being rotatable by a handle.

10. The track apparatus according to claim 9, wherein the machine base has a slot in which the carrier is slidably guided.

11. The track apparatus according to claim 1, wherein the moving path of the chain conveyor is generally triangular.

12. A track apparatus for egg breaking mechanisms comprising:
    an endless chain conveyor extending along an endless, generally triangular moving path and carrying the egg breaking mechanisms;
    a drive sprocket assembly held in driving engagement with the chain conveyor and serving as a first direction change assembly positioned at a first apex of said moving path;
    an idle sprocket assembly held in engagement with the chain conveyor and serving as a second direction change assembly positioned at a second apex of said moving path; and
    a third direction change assembly contacting the chain conveyor and positioned at a third apex of said moving path, said third direction change assembly comprising an adjustable, nonrotatable chain tensioning mechanism for slidably guiding the chain conveyor.

13. The track apparatus according to claim 12, further comprising a pair of vertically-spaced chain guide rails, and a roller mounted to each of the egg breaking mechanisms, an upper surface of an upper one of the chain guide rails having a roller engaging means for supporting said rollers.

14. The track apparatus according to claim 13, wherein said endless chain conveyor comprises a pair of vertically-spaced chains, and the chain tensioning mechanism comprises a pair of vertically-spaced chain guide plates each having an arcuate sliding surface for slidably guiding a corresponding one of the chains.

15. The track apparatus according to claim 14, wherein an upper one of said vertically-spaced chain guide plates has an upper surface forming an arcuate roller guide, said arcuate roller guide extending generally flush and continuous with said upper surface of said upper one of the chain guide rails.

* * * * *